United States Patent [19]
Tuomaala

[11] 3,740,162
[45] June 19, 1973

[54] CENTRIFUGAL PUMP

[75] Inventor: Jorma Aarne Kullervo Tuomaala, Karhula, Finland

[73] Assignee: A. Ahlstrom Osakeyhtio, Noormarkku, Finland

[22] Filed: Nov. 23, 1970

[21] Appl. No.: 91,913

[30] Foreign Application Priority Data
Dec. 4, 1969 Finland............................ 3523/69

[52] U.S. Cl..................... 415/98, 415/201, 417/423
[51] Int. Cl. ....................... F04d 1/00, F04d 17/08
[58] Field of Search ...................... 415/97, 98, 201; 417/360, 423, 424

[56] References Cited
UNITED STATES PATENTS

| | | | |
|---|---|---|---|
| 1,334,461 | 3/1920 | Kerr................. | 415/98 |
| 1,471,559 | 10/1923 | Knauf................ | 417/360 |
| 1,704,481 | 3/1929 | Lawaczeck......... | 415/201 |
| 1,991,761 | 2/1935 | McHugh............. | 415/201 |
| 2,661,698 | 12/1953 | Schellens........... | 415/97 |
| 2,947,260 | 8/1960 | Hornschuch........ | 417/424 |
| 3,457,869 | 7/1969 | Janctz................ | 415/98 |

Primary Examiner—Henry F. Raduazo
Attorney—Albert M. Parker

[57] ABSTRACT

To a housing with an inlet and an outlet and one or two end walls there is detachably attached a support for a bearing box to mount a shaft in bearings outside the housing. A bushing is projecting through one end wall of the housing and supporting an impeller at the end inside the housing. The other end is in endwise friction contact with the shaft which has a threaded hole coaxially in this end and a bore communicating with a circumferential groove in the bushing which groove is limited by the shaft end and the bushing. The bushing is mounted in bearings attached to the housing end wall and the shaft, bushing an impeller are connected to a rigid coaxial unit with a screw running through the bushing, the head of the screw being pressed against the impeller and the opposite end being threaded to provide a thread joint the shaft having a correspondingly threaded hole. The pitch of the thread is so great that the joint is not self-locking, but is easily opened by pressing a lubricant between the shaft and the bushing through the bore and the recess.

3 Claims, 3 Drawing Figures

JORMA AARNE KULLERVO TUOMAALA
INVENTOR.

BY *Albert M. Parker*

ATTORNEY.

CENTRIFUGAL PUMP

BACKGROUND OF THE INVENTION

1. Field of the Invention

The invention relates generally to the field of centrifugal pumps and especially to pumps in which the impeller is mounted asymmetrically with bearings.

2. Description of the Prior Art

It is often necessary to check and change the inner parts of a pump; this is easily done in pumps whose housing is divided on the level of the shaft so that the suction and pressure openings are in the lower part of the housing — which is a popular construction — by removing the upper part of the housing, in which case the pipe joints and the driving motor need not be detached. A construction like this has, however, certain drawbacks; for example, it is difficult to work the inner side of the housing because it must be done through shaft openings with a relatively small diameter. The fact that the flanges of the inlet and the outlet are on the same side of the plane of section also sets certain limitations to the arrangement of the pump and the pipes.

In another construction the plane of section is perpendicular to the shaft, in other words, the housing is provided with a front cover on one or both sides, in which case the construction has the advantage that the directions of the inlet and the outlet can be chosen arbitrarily. It is easy to work a housing like this, because the shaft with its impeller can be removed for maintenance without detaching the pipe joints. It has the drawback that the removal of the impeller, the shaft, and the bearing application, which is usually asymmetrical in a pump like this, demands space, which is usually provided by placing a detachable part between the coupling halves of the pump and the motor; this part has to be removed before the impeller can be pulled out of the pump housing in an axial direction. The result of this is that the total length of the pump and motor combination becomes great. To eliminate this drawback, it has been suggested that the shaft should be made in two parts, in which case the parts of the shaft are connected with an axially detachable shell clutch and the ends of the axis opposite to each other are cut obliquely as shown in Finnish Pat. No. 40363. The construction is, however, very complicated and the maintenance of the pump inconvenient because a great number of screws have to be opened before the impeller can be pulled out of the housing. In addition, the bearings are easily tainted while the bearing application is open.

SUMMARY OF THE INVENTION

According to the invention there is provided a centrifugal pump, in which the impeller is attached to the shaft by means of a screw running through a shaft bushing placed between the impeller and the shaft to create a friction joint between the bushing and the shaft which has a coaxial threaded hole at the end facing the bushing to engage a correspondingly threaded end of the screw for providing a thread joint which is not self-locking.

The invention provides several advantages in view of the prior art apparatuses. For example, the parts that wear off, such as the bushing of the shaft and the impeller, can be changed easily and quickly, the structural length of the pump and the space needed for maintenance are small, and the bearing box need not be opened except for the checking of the bearings. In addition, the same shaft part can be connected with shaft bushings and impellers of different materials and of different materials and of different sizes, so that the manufacture of shafts can take place advantageously in long series.

The hydraulic parts and the bearing box form separate service units replaceable independently of each other.

If the pump is provided with a mechanical packing it is necessary to remove only the separate bearing box to replace the packing.

DESCRIPTION OF THE PREFERRED EMBODIMENTS

Figure 1:
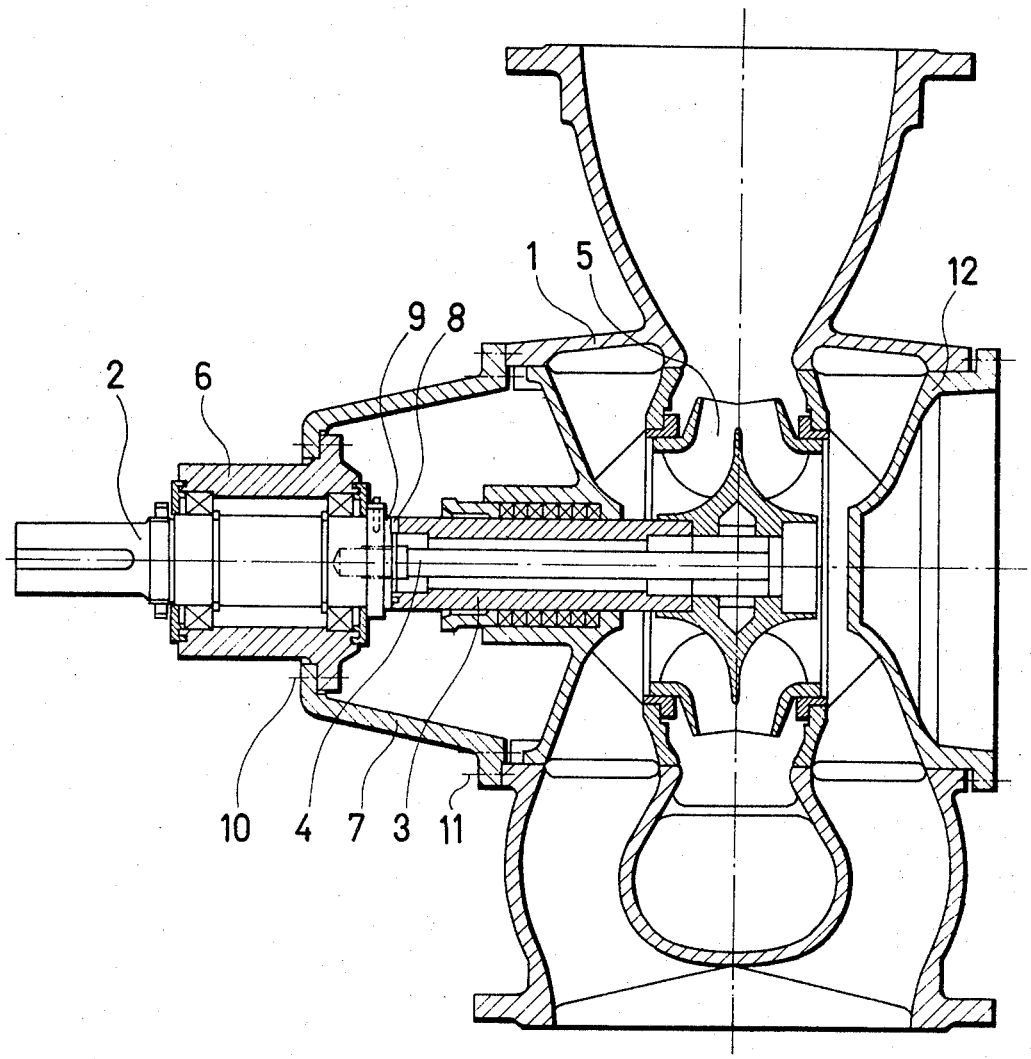
FIG. 1 is a longitudinal section of a pump according to the invention.

In FIG. 1 reference number 1 refers to the pump housing, which has been fitted to its base with a method known as such. The shaft of the pump is composed of the shaft part 2, the shaft bushing 3, and a screw 4 inside the latter; the impeller 5 and the shaft parts are pressed together with the screw. At the left end of the screw 4 (FIG. 1) there is a threaded part which has been fitted to the respective threaded hole in the shaft part.

The shaft part has been attached with bearings to the bearing box 6, which has been attached to the pump housing with the help of a bearing support 7.

The driving motor has been coupled to the pump with a coupling half 13, which has been placed at the end of the shaft part and is not shown in more detail.

Figure 2:
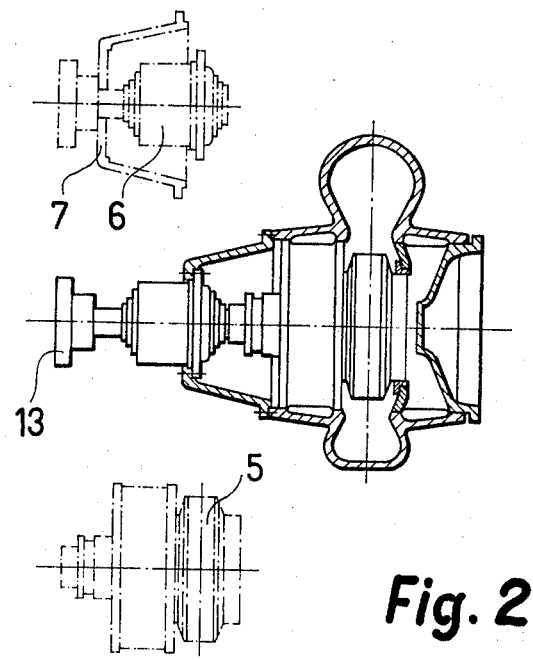
FIG. 2 is the same pump during one phase of the demounting.

Under the influence of the torsional moment of the driving motor, the screw 4, the direction of which is the same as the rotational direction of the motor, is tightened and presses the parts of the shaft and impeller combination together. When the torsional moment is eliminated, the tightening force created by the torsional moment remains in the screw 4, and the combination stays tightly together because of the friction effective between the contact surfaces of the parts. At the end of the shaft bushing there is a groove 8, which is in contact with a bore 9 at the end of the shaft part. When lubricant is squeezed into the groove of the shaft bushing through the bore 9, the friction at the contact point between the shaft and the bushing decreases to such an extent that the joint opens under the influence of the torsional moment caused by the non-self-locking thread of the screw 4. The pitch of the threads in the screw 4 corresponds to the threads in the shaft end, and such pitch has been found to be advantageously in the range of 5°–12° for providing a thread joint which is not self-locking. Then the locking screws 10 and 11 are opened to transfer the support 7 to the left in FIG. 1 so that the shaft bushing 3 is exposed. Thus it is possible to rotate the bushing 3 in reverse direction, while the shaft is held against rotation or vice versa to demount the composed axis comprising the bushing 3, the impeller and the screw 4 from the shaft 2. It is understood, although not specifically indicated in the drawings that the screw 4, the bushing 3 and the impeller cannot rotate in relation to each other. It is also possible to provide the support 7 with holes to enable demounting of the shaft and the screw before the support is detached. Then the shaft part with its bearings can be removed, as is shown in FIG. 2, without moving the driving motor of the pump. After this, the impeller can be pulled out of the housing of the pump. Another alternative is to remove the cover 12 and to pull the impeller out through the opening covered by the cover 12, in which case the shaft part with its bearings stays in its place. In this modification the head of the screw 4 is provided with recesses to remove it by rotation with some suitable tool well-known in the art. The screw need not be fixed to the impeller but can rotate in relation thereto. From FIG. 2 it is clearly seen that the support 7 and the bearing box 6 are removed perpendicularly to the axis of the pump.

Figure 3:
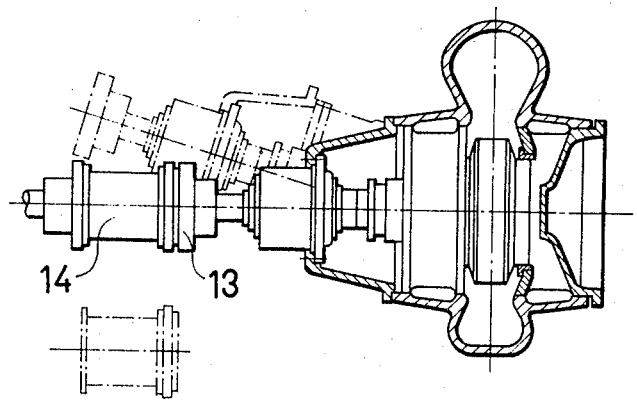
FIG. 3 is, for the sake of comparison, the respective phase of the demounting of a pump with a conventional construction.

FIG. 3 shows, for the sake of comparison, a conventional construction, in which the intermediary part of the coupling 14 has to be removed before the impeller with its shaft can be pulled out. It is evident from the figure that a construction like this requires considerably more space.

What is claimed is:

1. A centrifugal pump comprising in combination:
a housing having an inlet and an outlet for the media to be pumped and at least one end wall;
a rotation shaft with a threaded hole coaxially in one end thereof;
a support detachably attached to the housing;
a bearing box attached to the support for mounting the shaft in bearings;
a shaft bushing in endwise frction contact with the shaft and projecting through the housing end wall;
bearings atached to the housing end wall for supporting the bushing;
an impeller fixed to the end of the bushing inside the housing; and
a screw running through the bushing for connecting the impeller, bushing and shaft to a rigid coaxial unit, the screw being provided at one end with a thread the pitch of which is from 5°–12° and corresponding to the thread in the shaft end to provide a thread joint the pitch of which is not self-locking.

2. A centrifugal pump comprising in combination:
a housing having an inlet and an outlet for the media to be pumped and at least one end wall;
a rotatable shaft having in one end thereof a bore and a coaxial threaded hole;
a support detachably attached to the housing;
a bearing box attached to the support for mounting the shaft in bearings;
a shaft bushing in endwise friction contact with the shaft end having the threaded hole and the boring, the end of the bushing facing the shaft having a circumferential groove limited by the shaft end and the bushing and communicating with the boring, the other end of the bushing projecting through the housing end wall;
bearings attached to the housing end wall for supporting the bushing;
an impeller fixed to the other end of the bushing; and
a screw running through the bushing for connecting the impeller, bushing and shaft to a coaxial unit, the screw being provided at one end thereof with a thread the pitch of which is from 5°–12° and corresponding to the thread in the shaft end to provide a thread joint the pitch of which is not self-locking.

3. The centrifugal pump as recited in claim 2 having two end walls opposite each other, wherein the end wall facing the impeller is detachable and the screw head, which is exposed when the detachable end wall is removed, is provided with recesses to enable the removing of the screw.

* * * * *